(12) United States Patent
Fischer et al.

(10) Patent No.: US 7,858,021 B2
(45) Date of Patent: Dec. 28, 2010

(54) CONVEYOR SYSTEM, COMPOSITE SYSTEM AND METHOD FOR COUPLING METALLURGICAL METHODS

(75) Inventors: Harald Fischer, Linz (AT); Ernst Oberndorfer, Linz (AT); Hanspeter Ofner, Pucking (AT); Wilhelm Schiffer, Traun (AT)

(73) Assignee: Siemens Vai Metals Technologies GmbH & Co. (AT)

( * ) Notice: Subject to any disclaimer, the term of this patent is extended or adjusted under 35 U.S.C. 154(b) by 236 days.

(21) Appl. No.: 12/096,478

(22) PCT Filed: Nov. 27, 2006

(86) PCT No.: PCT/EP2006/011349

§ 371 (c)(1),
(2), (4) Date: Jul. 11, 2008

(87) PCT Pub. No.: WO2007/065582

PCT Pub. Date: Jun. 14, 2007

(65) Prior Publication Data

US 2008/0289450 A1    Nov. 27, 2008

(30) Foreign Application Priority Data

Dec. 7, 2005    (AT) .............................. A 1958/2005

(51) Int. Cl.
*B65G 17/32*    (2006.01)
(52) U.S. Cl. .................... 266/178; 266/180; 266/157
(58) Field of Classification Search ................. 266/180, 266/178, 157
See application file for complete search history.

(56) References Cited

U.S. PATENT DOCUMENTS 2,894,831 A    7/1959    Old et al.
4,347,084 A *  8/1982    Hahn et al. .................... 75/245

(Continued)

FOREIGN PATENT DOCUMENTS

DE    25 56 714    12/1975

(Continued)

OTHER PUBLICATIONS

Machine translation of JP 2005-231797 A by Komoda et al, published Sep. 2, 2005.*

(Continued)

*Primary Examiner*—George Wyszomierski
*Assistant Examiner*—Tima M McGuthry-Banks
(74) *Attorney, Agent, or Firm*—Ostrolenk Faber LLP (57) ABSTRACT

A conveying system comprising elements for conveying lumpy, particularly hot, conveying stock and a cover for shielding the conveying stock. Disclosed are measures for inerting the conveying stock. A combined system encompasses a reduction plant for reducing oxides in a continuous process and processing unit for producing liquid metal in a discontinuous process. The reduction product is deliverable from the reduction plant to the processing unit. A method for coupling a reduction method used for reducing oxides in a continuous process and a method used for producing liquid metal in a discontinuous process. A reduction product from the reduction method is fed to the liquid metal production method for processing.

12 Claims, 4 Drawing Sheets

U.S. PATENT DOCUMENTS

| | | |
|---|---|---|
| 4,514,218 A | 4/1985 | Inagaki |
| 4,517,448 A * | 5/1985 | Crain et al. ............... 219/388 |
| 5,611,838 A | 3/1997 | Fritz et al. |
| 5,946,339 A | 8/1999 | True |
| 6,200,363 B1 | 3/2001 | Whitten, Jr. et al. |
| 6,524,362 B1 | 2/2003 | Eichberger et al. |
| 6,736,876 B1 | 5/2004 | Shin et al. |
| 7,172,640 B2 | 2/2007 | Berger et al. |
| 2003/0097908 A1 | 5/2003 | Hoffman et al. |

FOREIGN PATENT DOCUMENTS

| | | |
|---|---|---|
| DE | 3326505 | 2/1985 |
| DE | 3621323 | 1/1987 |
| DE | 3806861 | 6/1989 |
| DE | 196 08 530 | 8/1997 |
| DE | 19744151 | 10/1997 |
| EP | 0134 852 | 9/1983 |
| EP | 0462 713 | 5/1991 |
| EP | 0663 450 | 1/1995 |
| EP | 0 657 549 | 6/1995 |
| EP | 0899345 | 3/1999 |
| FR | 670910 | 3/1928 |
| FR | 1 481 142 | 4/1966 |
| GB | 2115011 | 9/1983 |
| JP | 52145319 | 12/1977 |
| JP | 53133521 | 11/1978 |
| JP | 8285473 | 11/1996 |
| JP | 11139562 | 5/1999 |
| JP | 2000140811 | 5/2000 |
| JP | 2000358216 | 12/2000 |
| JP | 2005231797 | 9/2005 |
| JP | 2006105544 | 4/2006 |
| WO | WO 93/13228 | 7/1993 |
| WO | WO 99/18245 | 4/1999 |
| WO | WO 0065102 | 11/2000 |
| WO | WO 01/14598 | 3/2001 |
| WO | WO 2006/111579 | 10/2006 |
| WO | WO 2007/065582 | 6/2007 |

OTHER PUBLICATIONS

International Search Report dated Jun. 1, 2007 issued in corresponding PCT Application No. PCT/EP2006/011349.

* cited by examiner

CONVEYOR SYSTEM, COMPOSITE SYSTEM AND METHOD FOR COUPLING METALLURGICAL METHODS

CROSS REFERENCE TO RELATED APPLICATION

The present application is a 35 U.S.C. §§371 national phase conversion of PCT/EP2006/011349, filed Nov. 27, 2006, which claims priority of Austrian Application No. A 1958/2005, filed Dec. 7, 2005. The PCT International Application was published in the German language.

BACKGROUND OF THE INVENTION

The invention relates to a conveyor system, in particular a bucket conveyor or star feeder, having conveyor elements for conveying pelletized, in particular hot, material to be conveyed, having a cover for shielding the material to be conveyed.

The invention also relates to a composite system having a reduction system for reducing oxides in a continuous process, in particular a direct reduction system, and a process assembly for manufacturing liquid metal, in particular an electric steel works, in a discontinuous process, wherein the reduction product can be fed from the reduction system to the process assembly.

The invention also relates to a method for coupling a reduction method, for reducing oxides in a continuous process, in particular in a direct reduction, and a method for manufacturing liquid metal in a discontinuous process, in particular an electric steel method, wherein a reduction product is fed from the reduction method to the method for manufacturing liquid metal for processing.

The invention also relates to a method for operating a conveyor system, in particular a bucket conveyor or star feeder, having conveyor elements for feeding pelletized, in particular hot, material to be conveyed, having a cover for shielding the material to be conveyed.

Conveyor systems for conveying pelletized and hot material to be conveyed in order to process said material in metallurgical reactors are known from the prior art.

U.S. Pat. No. 6,214,986 discloses, for example, a device and a method for supplying, for example, a smelting process with hot and cold direct reduced iron (DRI), wherein the DRI is moved, under the force of gravity, from a DRI generating system to a DRI consumer for further processing. It is disadvantageous here that the entire flow of material occurs only under gravity so that differences in height in the system define tight limits.

For example, US 2002/130448 also discloses transporting pelletized material from a reduction system for a further processing stage by pneumatic conveyance under a protective gas. In particular the increase in the fine proportion as a result of abrasion during the pneumatic transportation which can lead to considerable disadvantages in a further processing step and entails costly treatment of fine materials is disadvantageous here.

SUMMARY OF THE INVENTION

Taking the prior art as a starting point, the object of the present invention is to make available a conveyor system which permits the pelletized material to be conveyed to be transported under protective gas and avoids the disadvantages from the prior art. The object according to the invention is achieved by means of the conveyor system according to the invention.

The conveyor system according to the invention permits pelletized material to be conveyed, with contact between the material to be conveyed and the ambient atmosphere being avoided by introducing protective gas so that no undesired reactions can occur between the material to be conveyed and an ambient atmosphere. In order to shield the material to be conveyed, a covered conveyor system having conveyor elements is proposed, wherein the conveyor elements with the material to be conveyed can be held under a protective gas atmosphere within the cover.

According to one specific embodiment of the conveyor system according to the invention, a cover has lateral and upper gastight walls. The distributor lines are arranged on the insides of the lateral covers, the latter being supplied by lines which penetrate the lateral cover.

According to one advantageous embodiment of the conveyor system according to the invention, the cover has thermal insulation for reducing the cooling of the material to be conveyed. In particular in the case of hot material to be conveyed which is still to be conveyed or further processed in the warm state from the preceding process stage, it is advantageous if an insulation can be provided and heat losses kept low. Owing to the thermal activation of a large number of reaction processes it is all the more important in the case of hot material to be conveyed that the protective gas prevents undesired or uncontrollable chemical reactions with the ambient atmosphere.

According to one further advantageous embodiment of the conveyor system according to the invention, the distributor lines are embodied as perforated pipes for uniformly distributing protective gas within the cover. The uniform rinsing with protective gas permits a sufficiently inert protective gas atmosphere to be set, with the quantity of necessary protective gas being able to be kept as low as possible. In order to achieve this, it is necessary to apply protective gas very uniformly, in which case, in particular, the ingress of ambient gases such as, for example, air, is to be prevented. The use of perforated pipes permits a multiplicity of inlet openings and thus a very uniform application of protective gas.

According to one suitable embodiment of the conveyor system according to the invention, a plurality of distributor lines on the conveyor system permits at least one protective gas to be supplied in a way which can be regulated separately at least in certain areas. This measure permits significantly better control of the rinsing with protective gas so that when there is a low requirement for protective gas it is nevertheless possible to ensure that the material to be conveyed is shielded completely.

One alternative embodiment of the conveyor system according to the invention provides for protective gas to be applied to the distributor lines via feed lines which are combined in certain sections and which are respectively connected to separate supply lines with at least one central protective gas supply. This arrangement permits protective gas to be applied to the conveyor system in certain sections and on a locally targeted basis. At least one protective gas is applied to the sections via one or more central protective gas supplies via a plurality of supply lines. It is conceivable to introduce various quantities of a protective gas and even different protective gases or else mixtures of protective gases at different sections. As a result, the conveyor system can be rinsed with protective gas according to the requirements and in the process its quantity can be adapted approximately corresponding to the temperature conditions or else the flow situation of the protective gas in the conveyor system. The distributor pipes are supplied with protective gas by feed lines after having been combined as a group in certain sections. Usually, approximately 10 to 25 distributor pipes can be combined in one section. The number of sections per conveyor system can be selected according to the length of the conveyor system, with 4 to 8 sections having proven advantageous in order to ensure selective supply with protective gas.

According to one particular embodiment of the conveyor system according to the invention, the distributor lines have bore holes and/or slits on their upper sides and under sides. These are arranged directed upward and/or downward to the directional introduction of the protective gas parallel to the lateral cover. It has proven disadvantageous to direct the protective gas directly onto the material to be conveyed since a considerable generation of dust can occur here. The targeted, directional introduction of the protective gas essentially parallel to the lateral cover in the upward and downward directions ensures reliable rinsing of the region inside the covers. The downwardly directed part of the introduced protective gas also prevents the ingress of ambient atmosphere since there is always an outward directed stream of protective gas present.

According to one specific embodiment of the conveyor system according to the invention, the conveyor system is arranged at an incline, in particular at an angle of 10° to 50°, preferably at an angle of 20° to 35°. This arrangement of the conveyor system allows considerable differences in height to be overcome so that the system-induced or process-induced differences in level can also be overcome. Owing to the protective gas it is possible to avoid the sucking in of ambient air through the thermally induced and upwardly directed gas stream and penetrating the ambient atmosphere which occurs in the case of hot conveyor gas so that even at relatively large angles of inclination contact between the material to be conveyed and the ambient atmosphere can be avoided.

According to one advantageous refinement of the conveyor system according to the invention, the cover has sealing gaps adjacent to the conveyor system, which are provided for carrying away excess protective gas and for cooling the conveyor system. In order to keep the quantity of necessary gas as low as possible, sealing gaps are provided which on the one hand reduce the egress of protective gas and on the other hand prevent the ingress of the ambient atmosphere. Owing to the moving parts of the conveyor system and the rough operational conditions such as, for example, the high thermal loading, shocks and dust particles, non-touching seals are advantageous in order to achieve large service lives without a large amount of expenditure on maintenance. A targeted quantity of emerging protective gas can relieve the thermal loading on moving parts or also on the supporting structure of the conveyor system and have a cooling effect. The quantity of protective gas can be selected here according to the requirements so that reliable shielding with protective gas, sufficient cooling and a low consumption of protective gas can be brought about.

According to one possible embodiment of the conveyor system according to the invention, throttle ledges are provided above the distributor lines, in the region of the upper end of the conveyor elements. These serve to prevent the ingress of ambient atmosphere into the conveyor element, with a narrow gap being present between the throttle ledges and the conveyor elements. The throttle ledges permit further reduction of the necessary protective gas since the throttle ledges ensure that a smaller amount of gas is exchanged. In this context, the gap width is given such small dimensions that as little gas as possible is exchanged, with a minimum gap having to be maintained for safety reasons and in order to avoid contact between the conveyor element and the throttle ledges. The gap width has to be defined on the basis of thermal expansion and movements of the conveyor elements, with gaps from 1 to 10 cm, preferably 2 to 4 cm being maintained. A further consequence of this is smaller thermal loss when a hot material to be conveyed is conveyed.

A further possible embodiment of the conveyor system according to the invention provides for the controlled charging of the conveyor system a conveyor element, in particular a star feeder or a screw conveyor, in which case, before the conveyor system is charged with material to be conveyed, the conveyor element can be rinsed with a protective gas in order to remove atmospheric oxygen. In order to be able to ensure a constant conveyed quantity for a further process, it is essential to charge the conveyor system in a controlled fashion. For this purpose, for example, star feeders are known which can apply a volumetrically constant quantity of material to be conveyed. In order also to be able to avoid uncontrolled reactions of the material to be conveyed with the ambient atmosphere in the region of the conveyor element, there is provision for the conveyor element or its conveyor cells to be rinsed with a protective gas. As a result, for example, residual oxygen can also be removed from the conveyor element.

According to one particular embodiment of the conveyor system according to the invention, a master slide and a downstream ball valve are provided for shutting off the conveyor element. This measure permits the conveyor element and the conveyor system to be rinsed with protective gas even if the supply of material to be conveyed is also interrupted.

According to one specific refinement of the conveyor system according to the invention, the conveyor element also comprises a conveyor chute which can be rinsed with protective gas and has the purpose of feeding in the material to be conveyed onto the conveyor system. The constant and controlled quantity of material to be conveyed from the conveyor element is applied to the conveyor system via a chute, there being provision for rinsing with protective gas which ensures a protective gas atmosphere for the material to be conveyed, even in the region of the chute. This measure allows the material to be conveyed to be moved continuously under protective gas.

According to one advantageous refinement of the conveyor system according to the invention, extractor devices, in particular injector extractors, having separate dust hoods for extracting dust particles are provided in the region of the feeding in points and/or ejection points of the conveyor system, in which case extractor pipes are arranged in the dust hoods in such a way that secondary air can be sucked in in order to cool the extracted gases or dust particles. During the feeding in or ejection of material to be conveyed it is possible for dust to be generated owing to unavoidable fine particles in the material to be conveyed, and said dust can constitute a very considerable environmental load. In order to minimize this load on the environment, extractor devices are provided which also extract protective gas as well as the dust particles. In order to avoid an excessively high thermal load on the extractor devices when hot material to be conveyed is being conveyed, the extractor hoods or the extractor pipes are arranged in such a way that considerable quantities of secondary air are also sucked in, in order to cool the mixture of protective gas and air. The secondary air can constitute here a proportion of 10 to 80% of the entire gas quantity, with the quantity being selected in accordance with the thermal situation.

The object according to the invention is also achieved by means of the inventive composite system according to the invention.

Composite systems require the processes to be matched to one another or necessitate the exploitation of advantages which result, for example, from the direct processing of a generated intermediate product in a further method stage. For example, the processing of a still warm or hot product in a subsequent process stage is advantageous because in this way a significant advantage can be achieved in terms of energy costs. Owing to different process sequences which is often necessary to provide special process connections and associated systems in order to be able to utilize the advantages of a composite system. The composite system according to the invention permits synergies to be used in the coupling of a reduction system to a process assembly in order to manufacture liquid metal, for example liquid steel. When a continuously occurring reduction method in a reduction system is coupled to a discontinuously occurring process, for example a steel generating method in an electric steel works, it is necessary to provide decoupling devices such as, for example, buffer devices. The buffer device can collect the continuously generated intermediate product so that it can be processed further in a discontinuous fashion, for example in batches. In addition to the reduction product, it is also possible to introduce further starting materials into the process assembly.

A further very essential precondition for the direct processing of a reduction product is the system engineering connection of the systems to one another. In this context, considerable differences in height often have to be overcome in order to permit charging. Furthermore it is necessary to protect a still hot reduction product to such an extent that there are no damaging or uncontrolled reactions with the ambient atmosphere which can, for example, lead to a reduction in the already present degree of metallization. For this reason, according to the invention, the reduction system is connected to the process assembly for manufacturing liquid metal via the inventive conveyor device This can ensure that the reduction product can be reliably placed under protective gas from the reduction system into the process assembly for manufacturing liquid metal.

According to one particular embodiment of the composite system according to the invention, the buffer device comprises at least one buffer silo. The buffering permits batch to batch charging which is adapted to the process assembly, with the buffer silo being able to be adapted in terms of its storage capacity to the requirements of the systems to be connected. Since the processes coupled in the composite system have different requirements in terms of the method, optimal processing states can nevertheless be achieved by at least partial decoupling of the methods, utilizing the synergies of the two system components.

According to one advantageous embodiment of the composite system according to the invention, the buffer device comprises two buffer silos for alternately charging or emptying. The arrangement of two independent assemblies permits even better charging of the process assembly, with alternate use of the silos permitting even greater flexibility with respect to charging.

According to one particularly advantageous embodiment of the composite system according to the invention, the buffer device has an insulating means. As a result, the chronological decoupling of the material flows of the reduction product can be configured better, while at the same time low heat losses of the reduction product can be maintained.

One particular embodiment of the composite system according to the invention provides for the buffer device to have at least one ball valve and/or a master slide for closing off the buffer device in a gastight fashion. Owing to the need to use a protective gas to protect the material to be conveyed, it is also necessary to avoid contact with the ambient atmosphere during buffering. A simple measure for achieving this has proven to be avoiding the ingress of ambient atmosphere by means of a master slide and a faucet. The master slide assumes here the function of coarse shutting off, which effectively retains material to be conveyed, so that the faucet is kept free of material to be conveyed. The faucet performs the gastight shutting off.

According to one alternative configuration of the composite system according to the invention, the buffer device has connections for rinsing with a protective gas and/or a cooling gas, in particular an inert gas for cooling in the case of a fault. The connection of a protective gas line permits the buffered conveyor material to be rinsed. In this context, the buffer device is rinsed with protective gas, like, for example, a buffer silo, with a protective gas discharge line also being provided in addition to a protective gas feed line so that the ingress of ambient atmosphere can be effectively prevented. In fault situations it is necessary to cool the hot, buffered conveyor material, in which case rinsing can also be carried out with the protective gas.

One specific embodiment of the composite system according to the invention provides that a feeding in device for additional starting materials is provided on the buffer device. This feeding in device permits the joint use of the buffered material to be conveyed with one or more added starting materials so that no additional devices are necessary. However, it is also alternatively possible to provide additional devices for inputting the starting materials separately.

According to one possible embodiment of the composite system according to the invention, the buffer device has at least one continuous weight measuring device for measuring the buffered reduction products and/or the starting materials. A simple solution has proven to be to carry out the charging on the basis of the measured weight of the material to be conveyed. In particular it is advantageous in this context for the charging into the process assembly to be able to be controlled in accordance with the weight, that is to say the charging can follow a predefined weight/time profile. In addition to the reduction product it is also possible to charge further starting materials together with this or else alternately.

According to one alternative embodiment of the composite system according to the invention, the buffer device has at least one conveyor element for the regulated charging of the reduction product and/or the starting materials into the process assembly. The conveyor element permits charging into the process assembly in a way which is controlled in terms of time and quantity so that an optimum process can be maintained. It is customary here to carry out the charging according to predefined quantity/time functions.

According to one specific embodiment of the composite system according to the invention, a discharge for the reduction product from the reduction system is provided upstream of the conveyor system, said discharge being connected to a material cooler for accommodating and cooling the reduction product. In fault situations or else in the case of special production cycles it is necessary to extract part of or all of the entire reduction product and feed it to a material cooler.

The object according to the invention is also achieved by means of the method according to the invention for coupling a reduction process and a method for manufacturing liquid material in accordance with the invention.

The coupling of a continuous process such as a reduction method to a discontinuous process such as a method for manufacturing liquid metal makes it necessary to decouple the process parts, for example by buffering the reduction product. This measure, which is disadvantageous per se, can be advantageously used to convey the reduction product, and possibly a further starting material, continuously under a protective gas atmosphere, or keep it under said atmosphere, for example by means of a star feeder. This ensures that the reduction product does not have to be additionally preprocessed but rather can be processed or charged directly. The uninterrupted inertization in a protective gas atmosphere allows the reduction material to be further processed even after buffering, with even hot reduction products being reliably protected against undesired reactions with the ambient atmosphere. What is essential here is the fact that the reduction material is always kept under protective gas, that is to say during the entire transportation process and the buffering as far as the charging into the process assembly.

According to one preferred embodiment of the method according to the invention, the conveyance of the reduction product and/or the starting material takes place discontinuously from the buffer device into the method for manufacturing a liquid metal. It is customary here for the charging to be carried out according to time/quantity functions which are predefined or else defined in the method, in order to optimize the process.

According to a further possible configuration of the method according to the invention the inputting of the reduction product into the method for manufacturing a liquid metal is carried out in a regulated fashion and on the basis of continuous weight measurement in the buffer device. The regulated inputting into the method for manufacturing liquid metal has proven an effective measure because precise process control or monitoring, in this case on the basis of simple measurements, is possible.

According to one particularly advantageous configuration of the method according to the invention, the reduction product is buffered without cooling and/or fed to the method for manufacturing liquid metal. By means of this process control it is possible to minimize heat losses and the expenditure of energy in the entire method. The measure of inertizing the hot reduction product makes it possible to buffer the reduction product, allowing undesired reactions such as, for example, oxidation reactions to be reliably avoided.

According to one advantageous configuration of the method according to the invention, the reduction product is direct reduced iron (DRI). DRI is defined by a high degree of metallization, that is to say by a very high proportion of metal. The high reactivity of the hot DRI makes the protective gas atmosphere necessary, in particular if the DRI has to be buffered. The method according to the invention allows high grade DRI to be used by utilizing the stored heat in a method for manufacturing, in particular, liquid steel. As a result, a particularly efficient method which satisfies the highest quality requirements is obtained.

According to a further advantageous configuration of the method according to the invention, part of the reduction product which cannot be processed directly in the method for manufacturing a liquid metal is extracted from the method for coupling. This measure permits, in the first instance, production quantities to be adapted when there are different capacities between the coupled methods and/or allows adaptation to specific method states such as, for example, in the event of faults in the method for manufacturing a liquid metal.

According to one possible embodiment of the method according to the invention, the reduction product, and if appropriate the starting material is buffered alternately in at least two buffer devices and fed to the method for manufacturing a liquid metal. The alternating method of operation allows the continuous process to be decoupled from the discontinuous part of the process. Furthermore, the buffering also provides a safety function for brief faults.

The object according to the invention is achieved by means of the method according to the invention for operating a conveyor system according to the invention. The inventive rinsing of the space in the conveyor system and inside the cover with protective gas ensures that ambient atmosphere does not penetrate and as a result contact with the material to be conveyed does not occur. In particular in the case of hot material to be conveyed, chemical reactions between the material to be conveyed and the ambient atmosphere can be prevented in this way. Shielding the material to be conveyed by means of a cover also reduces the ambient load, for example due to dust composed of fine particles in the material to be conveyed.

One particular embodiment of the method according to the invention provides for the protective gas between the cover and the conveyor system to be set to a low excess pressure of 0.01 to 0.4 bar, in particular 0.05 to 0.1 bar, relative to the surroundings, that the sucking in of ambient atmosphere into the conveyor system is prevented by the thermally induced suction in the conveyor system. The thermally induced suction occurs principally in conveyor systems with a relatively large angle of inclination and when the material to be conveyed is hot. This results in suction, which can suck in, for example, ambient air, in the entire region of the conveyor system. In order to reliably avoid the ingress of air, it is necessary to largely compensate for the suction by supplying a protective gas and to reliably prevent the entry of ambient atmosphere. To do this it is necessary to maintain an at least low excess pressure of the protective gas in the region of the conveyor system or inside the cover.

According to one possible configuration of the method according to the invention, the process gas of a reduction system or a burnt process gas from a reduction system, a flue gas from a metallurgical smelting furnace or an inert gas, in particular nitrogen, or mixtures thereof, are used as the protective gas. Furthermore, it is also possible to use mixtures of the aforesaid gases. The use of process gases provides the advantage that these gases are very cost effective and can be made available in sufficient quantities. If a sufficient quantity of protective gas is not available, additional protective gases such as, for example, nitrogen can also be used.

These are described in more detail below by reference to possible configurations.

DESCRIPTION OF PREFERRED EMBODIMENTS

Figure 1:
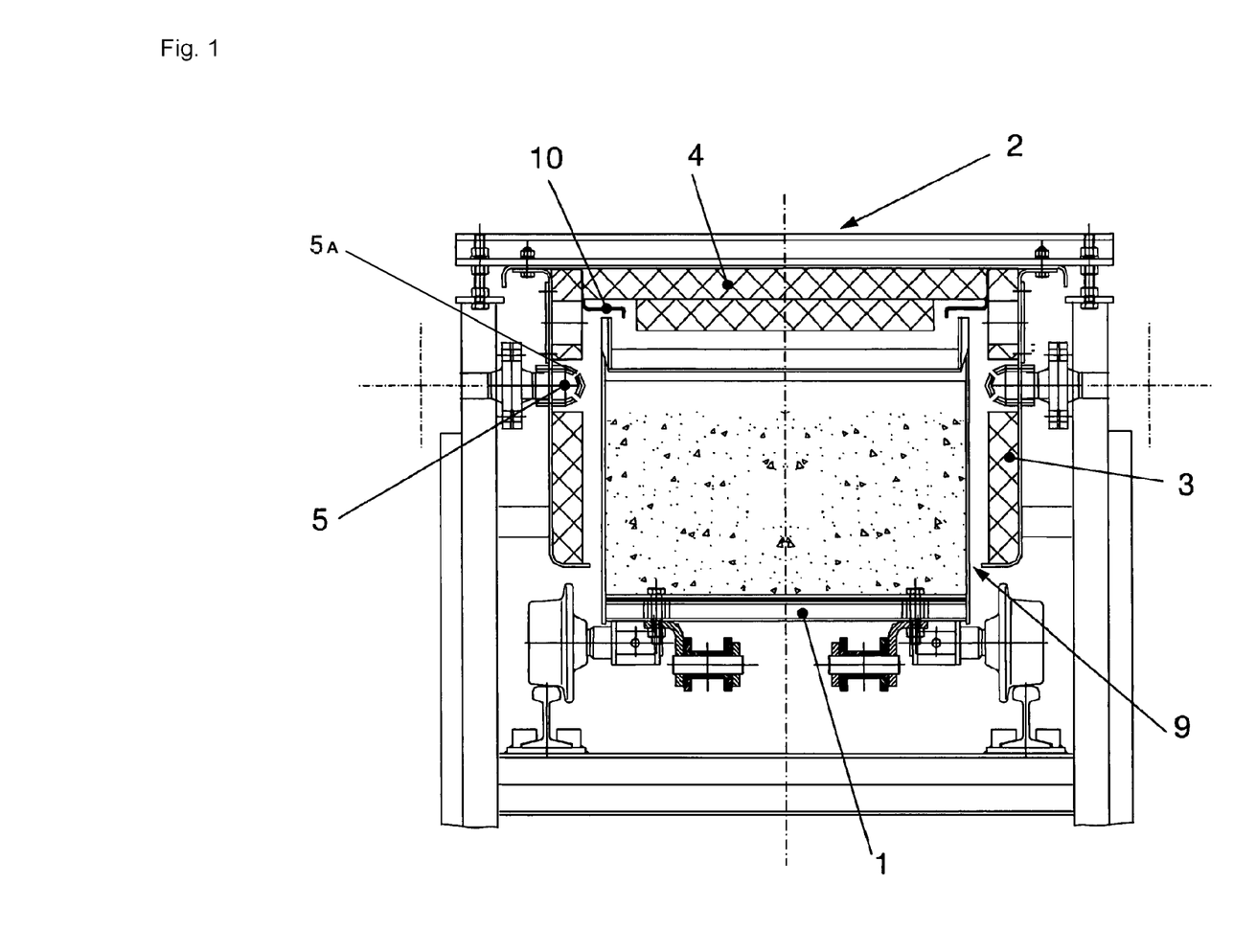
FIG. 1 shows the conveyor system according to the invention in a sectional view transversely with respect to the conveying direction.

The most significant components are illustrated in a sectional view in FIG. 1. The conveyor system has conveyor elements 1 for accommodating the material to be conveyed, which conveyor elements 1 can be embodied, for example, as conveyor cells or buckets such as are known from star feeders or bucket conveyors. The bucket conveyors slide, for example, on rails by means of wheels, it being possible to connect the buckets to one another by means of chains. The cover 2 is arranged above and to the side of the conveyor elements 1 and is formed from lateral gastight walls 3 and upper gastight walls 4. These walls have thermal insulation which on the one hand prevent warm material to be conveyed from cooling and on the other hand have a protective function for the surrounding steel structure. Furthermore, these walls avoid excessive loading of the surroundings with dust and exhaust gases.

Laterally arranged distributor lines 5 penetrate the lateral walls 3, the distributor lines 5 distributing, as perforated lines, a protective gas within the walls. The rinsing with protective gas principally protects the material to be conveyed against undesired reactions, in particular against oxidation, if it is still hot and has a high degree of reactivity with air.

The distributor lines 5 have bore holes and/or slits 5A on their upper sides and under sides, and these ensure directional inputting of the protective gas. This measure avoids any production of dust as a result of the material to be conveyed flowing directly in. Furthermore, reliable rinsing of the region within the covers is ensured. The downwardly directed partial quantity of introduced protective gas also prevents the entry of ambient atmosphere since an outwardly directed quantity of protective gas is always present.

In the region of the upper edge of the conveyor element 1, throttle ledges 10 are provided which prevent the ingress of ambient atmosphere into the conveyor element. In addition, sealing gaps 9 are provided by means of projecting elements in the region of the lower side walls of the material 1 to be conveyed, and these are provided to discharge excess protective gas and to cool the system.

Figure 2:
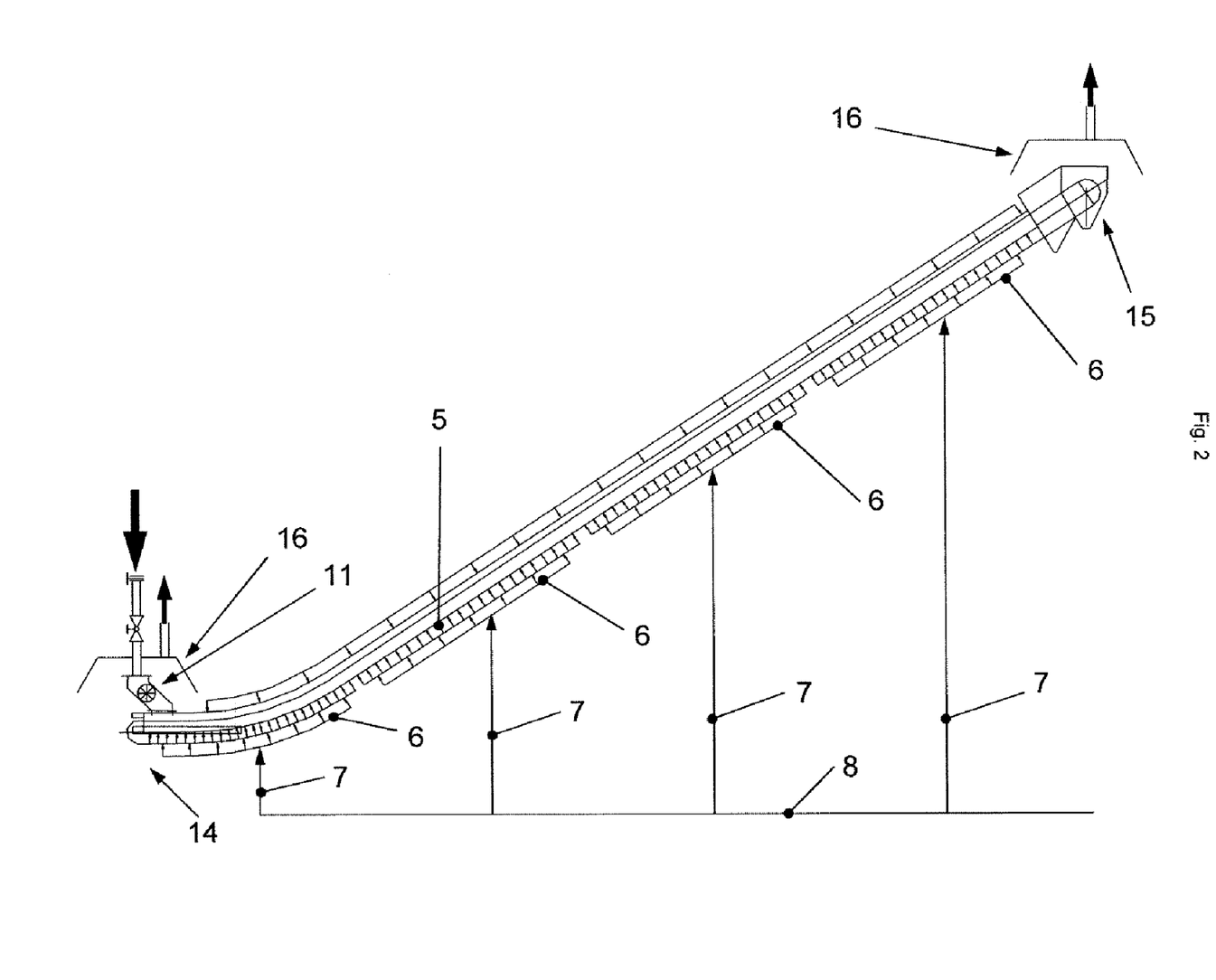
FIG. 2 shows the conveyor system according to the invention according to the invention in a schematic illustration.

FIG. 2 shows the conveyor system in a possible arrangement. The material to be conveyed is applied to the conveyor system at the feeding in point 14 by means of a conveyor element 11, which may be embodied for example as a star feeder. The star feeder permits a precise quantity to be fed onto the conveyor elements 1. In order to minimize the dust load in the region of the feeding in point 14 and the ejection point 15, extractor devices 16, in particular injector extractors, are provided. For the purpose of cooling, extractor pipes are arranged in such a way that the sucked out gases or dust particles can be cooled by means of sucked in secondary air.

The feeder means for the material to be conveyed have at least one slider valve and one ball valve so that the conveyor element 11 can be shut off. The conveyor element can be rinsed by means of protective gas so that even in this region the material to be conveyed can be protected effectively against ambient atmosphere. The chute which is rinsed with protective gas is provided in the region of the conveyor element 11 in order to feed the material to be conveyed onto the conveyor element.

The conveyor system is rinsed with protective gas via the distributor lines 5 via a central protective gas supply 8 and separate supply lines 7 which are connected to feeder lines 6 which are combined in certain sections. Owing to the arrangement in sections it is possible to adapt the quantity of protective gas to the local situation, that is to say to adapt the quantity of protective gas correspondingly.

Figure 3:
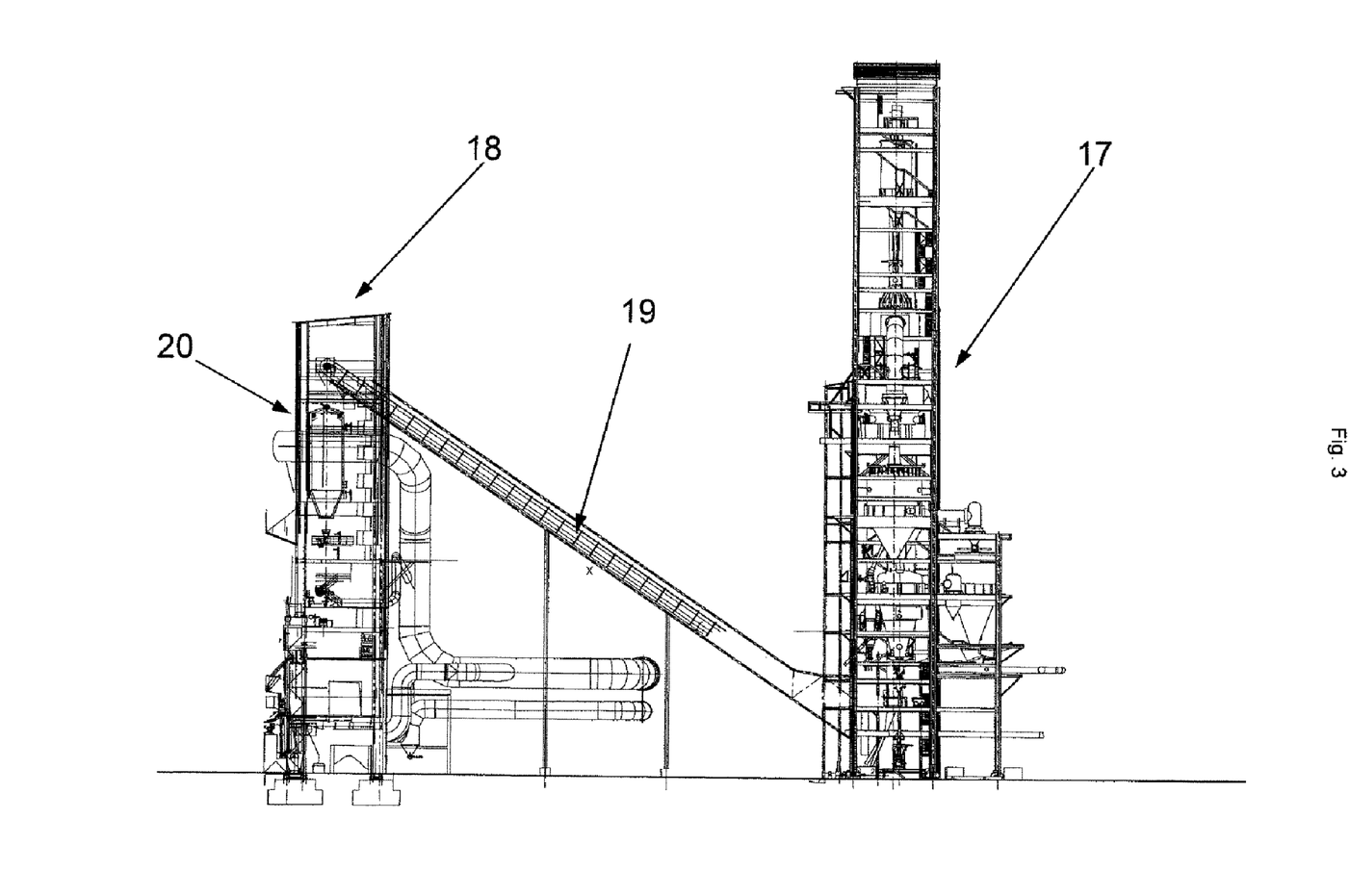
FIG. 3 shows the composite system according to the invention in an overview.

FIG. 3 is an overview of a possible arrangement of the composite system according to the invention. A reduction system 17 such as, for example a direct reduction system produces a precursor such as, for example, hot, direct reduced iron (HDRI) for a process assembly arranged downstream, for example an electric steel works. The two systems are connected to one another via the conveyor system 19 according to the invention, considerable differences in height also being overcome. The precursor can also be transported directly via the conveyor system in the hot state and fed to the process assembly. The inventive shielding of the precursor during the entire transportation process makes it possible to avoid undesired reactions with the ambient atmosphere and to keep the environmental load low. Before the further processing of the precursor in the process assembly, the precursor is buffered in a buffer device 20 which is usually arranged above the process assembly. In order to keep heat losses low, the buffer device has thermal insulation.

Figure 4:
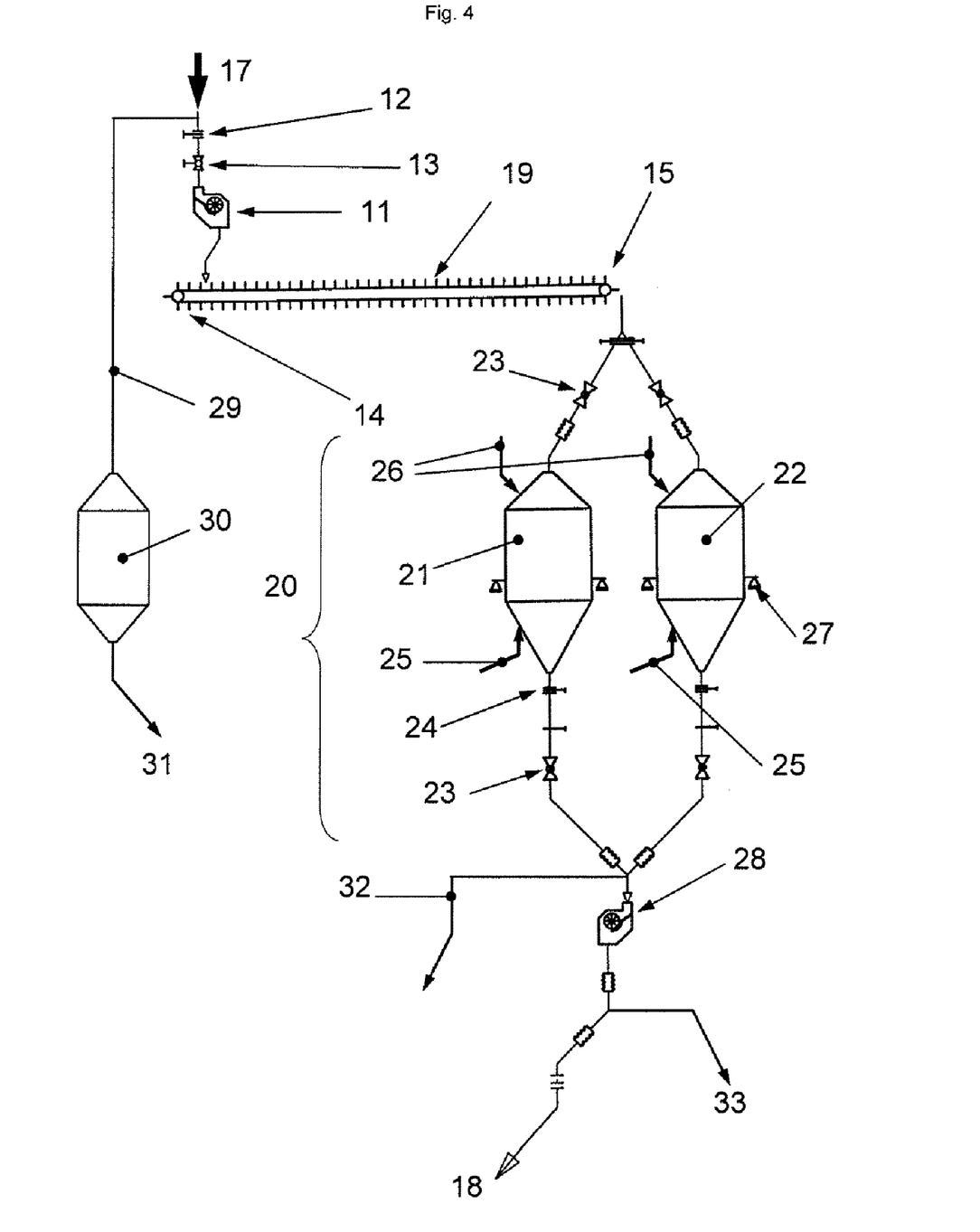
FIG. 4 shows the composite system according to the invention in a schematic illustration.

FIG. 4 illustrates the system situation between the reduction system 17 and the process assembly 18. The buffer device 20 advantageously has two buffer silos 21, 22 for accommodating the precursor. These can be charged or emptied alternately. In order to close off the buffer silos 21 and 22 in a gastight fashion, at least one master slide 24 and one ball valve 23 are provided. In order to rinse the buffer silos 21 and 22, connections 25 are provided for feeding in protective gas. In addition, the buffer silos have venting means (not illustrated) for discharging protective gas. Furthermore, feeding devices 26 for feeding in additional starting materials into the buffer silos 21 and 22 can be provided. The precursors to be charged are introduced in a controlled fashion from the buffer device 20 via a feed element 28 into the process assembly 18 for further processing. In order to permit continuous monitoring of the quantity of material in the buffer device, weighing devices 27 are provided at all the buffer silos 21, 22.

In order to permit reliable emptying of the buffer device 20 in fault situations, the buffered material can be discharged via a line 32 or 33. In the process, a material cooler can also be connected downstream.

In addition, in a fault situation a discharge means 29 for the preliminary material from the reduction system 17 is provided, it being possible to place the hot preliminary material in a material cooler 30 before it is dumped, for example.

The invention claimed is:

1. A conveyor system for pelletized, hot material comprising:
   a plurality of conveyor elements operable for conveying pelletized, hot, material to be conveyed over a conveyance path,
   a gastight cover over the path for shielding the material to be conveyed by the conveyor elements,
   at least one distributor line for feeding in a protective gas located on at least one inner side of the cover so that a space in the conveyor system and inside the cover may be rinsed with a protective gas and avoiding ingressing ambient atmosphere,
   the cover having lateral gastight walls and upper gastight walls, the at least one distributor line having bore holes or slits on opposing sides thereof, configured and operative to direct protective gas along an inward facing surface of the cover to form an outward directed stream of protective gas.

2. The conveyor system as claimed in claim 1, further comprising heat insulation at the cover to reduce the cooling of the material to be conveyed.

3. The conveyor system as claimed in claim 1, wherein the distributor lines comprise perforated pipes with perforation along the pipe in order to uniformly distribute the protective gas inside the cover.

4. The conveyor system as claimed in claim 1, comprising a multiplicity of the distributor lines operable to permit at least one protective gas to be supplied in a way which can be regulated separately at least in certain areas.

5. The conveyor system as claimed in claim 1, further comprising feed lines for feeding the protective gas to the distributor lines, and separate supply lines to which the feed lines are respectively connected and at least one central protective gas supply to the supply lines.

6. The conveyor system as claimed in claim 1, further comprising the conveyor system is arranged at an incline.

7. The conveyor system as in claim 1, further comprising sealing gaps at the cover and adjoining the conveyor system, the gaps being operable to carry off excess protective gas and to cool the conveyor system.

8. The conveyor system as claimed claim 1, further comprising throttle ledges above the distributor lines in the region of an upper end of the conveyor elements the ledges being shaped, positioned and operable to avoid air penetrating the conveyor element; a gap provided between the throttle ledges and the conveyor elements.

9. The conveyor system as claimed in claim 1, wherein the conveyor element is operable to charge the conveyor system in a controlled fashion, and wherein, before the conveyor system is charged with material to be conveyed, the conveyor element can be rinsed with protective gas in order to remove atmospheric oxygen.

10. The conveyor system as claimed in claim 9, further comprising a master slide upstream of the conveyor element and a ball valve downstream of the conveyor element and together being operable to shut off the conveyor element.

11. The conveyor system as claimed in claim 9, wherein the conveyor element comprises a conveyor chute, which can be rinsed with protective gas and is operable for feeding the material to be conveyed on to the conveyor system.

12. The conveyor system as claimed in claim 1, further comprising extractor devices comprising injector extractors with separate dust hoods for extracting dust, and located in the region of at least one of feeding in points and ejection points of the conveyor system;
    extractor pipes arranged in the dust hoods and operable such that secondary air can be sucked in in order to cool the extracted gases or dust particles.

* * * * *